United States Patent [19]
Hall

[11] Patent Number: 5,038,588
[45] Date of Patent: Aug. 13, 1991

[54] HIGH SECURITY T-HANDLE LOCK ASSEMBLY WITH FRONT HANDLE IMPROVEMENTS

[75] Inventor: Charles E. Hall, Salem, Va.

[73] Assignee: Medeco Security Locks, Inc., Salem, Va.

[21] Appl. No.: 563,632

[22] Filed: Aug. 7, 1990

[51] Int. Cl.$^5$ .......... B60R 25/02
[52] U.S. Cl. .......... 70/208; 70/417
[58] Field of Search .......... 70/208, 417; 292/DIG. 31

[56] References Cited

U.S. PATENT DOCUMENTS 4,552,001 11/1985 Roop .......... 70/208
4,835,998 6/1989 Steinbeck .......... 70/417

*Primary Examiner*—Robert L. Wolfe
*Attorney, Agent, or Firm*—Rothwell, Figg, Ernst & Kurz

[57] ABSTRACT

A T-handle lock assembly for vending machines or the like include a two-piece cylinder front handle and cylinder/extension rod housing subassembly which interlock by means of first and second asymmetrical flange edges integrally formed on the housing and corresponding recessed slots within the cylinder front handle. A single set screw is threaded into an aperture in the front handle extending in the direction of the slots to engage and rigidly secure the housing to the handle so that the lock cylinder is in alignment with a key access passage in the front surface of the cylinder front handle. The arrangement prevents access to the lock cylinder when in a locked condition even if the set screw is removed.

11 Claims, 4 Drawing Sheets

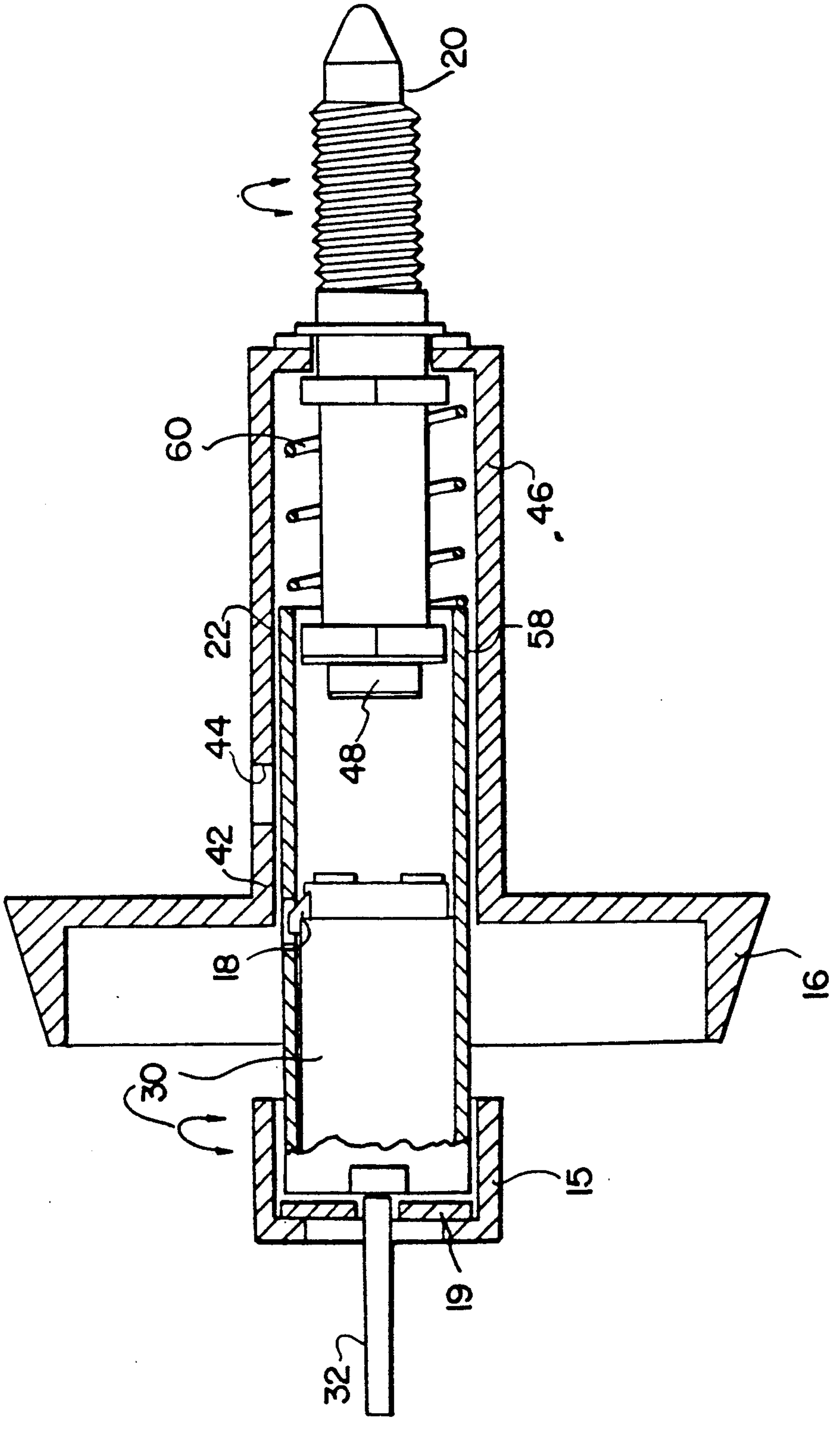
FIG. I

HIGH SECURITY T-HANDLE LOCK ASSEMBLY WITH FRONT HANDLE IMPROVEMENTS

BACKGROUND OF THE INVENTION

1. Field of the Invention

This invention relates generally to T-handle lock assemblies and more particularly to improvements in security and serviceability features of the handle and handle extension of high security T-handle lock assemblies.

2. Background and Prior Art

T-handle lock assemblies are commonly used to restrict access to vending machines and the like such as soft drink or food vending machines, currency changers, transit system fare collection machines, storage modules, and outdoor utility boxes. Because of the valuable nature of the contents of such machines and the usually unattended locations at which such machines and boxes are situated, such lock assemblies are highly susceptible to attack by thieves and others and require frequent servicing or replacement.

T-handle lock assemblies are known in the art. See, e.g., U.S. Pat. Nos. 3,089,329, 3,089,330, 4,132,092, 4,552,001, and 4,835,998.

Some years ago T-handles and extensions for T-handle locks were typically made of a single piece die cast material such as zinc which was relatively easy to break by hammering or prying and which did not provide much protection for the lock cylinder located within the extension. An improvement to the one piece T-handle is disclosed in aforementioned U.S. Pat. No. 4,552,001. The improved T-handle assembly includes a separate stainless steel cylinder front handle and cylinder/extension housing which connect to each other by virtue of bayonet type tabs on the end of the housing mating with corresponding slots in the front handle. The front handle contains a pair of small diameter holes which extend past the slots for insertion of metal driving pins to hold the tabs in place. The front handle provides greater security by preventing pulling of the lock cylinder from the front. However, the manufacturing process for this device is difficult and expensive since transverse-hole drilling of the stainless steel front handle is required. Additionally, removal of the driving pins is difficult and time consuming which increases the cost of servicing the lock assembly.

Another prior art approaach to improving the one piece die cast T-handle and extension is shown in U.S. Pat. No. 4,835,998. This patent shows a hollow steel front handle and a diecast extension piece having an inner handle. The front handle is attached to the inner handle by four set screws which are inserted into corresponding holes which must be drilled and tapped into the front handle. This combination suffers from a high cost of manufacturing due to the requirement for drilling and tapping four holes for the front handle set screws. In addition, servicing of the assembly is complicated by the need to remove and replace four set screws. The diecast inner handle/extension component is relatively weak and is subject to fracturing under attack, while the front handle may be removed by breaking away the outer housing and removing the set screws, thus providing access to the lock cylinder.

Thus, there remains a need in the art for an improved T-handle assembly which is easily manufactured and serviced and which provides a high degree of security against physical attack.

SUMMARY OF THE INVENTION

The present invention overcomes the problems in the prior art discussed above by providing a T-handle lock assembly of the type having a lock cylinder with a bolt, an extension rod, a cylinder/extension rod housing of elongated hollow shape for accommodating the lock cylinder and the extension rod and wherein the housing has an integral and substantially planar flange at one end thereof, first and second edges of the flange extending perpendicularly from the surface of the housing in an asymmetrical manner, and a cylinder front handle containing a passage for key access to said lock cylinder and having asymmetrical slot means for interlocking with said first and second edges of said flange. With this arrangement only a single set screw is needed to secure the housing to the cylinder front handle.

This invention further provides a T-handle lock assembly wherein the cylinder lock may not be accessed even if the outer housing is broken away and the set screw removed, so long as the assembly is in a locked position.

BRIEF DESCRIPTION OF THE DRAWINGS

The present invention will become more fully understood from the detailed description given hereinbelow and the accompanying drawings, which are presented by way of illustration only and thus are not limitative of the present invention, and wherein:

FIG. 1 is a partly cross sectional side view of a conventional T-handle lock assembly to which the present invention is applicable;

DETAILED DESCRIPTION OF THE PREFERRED EMBODIMENTS

Figure 3:
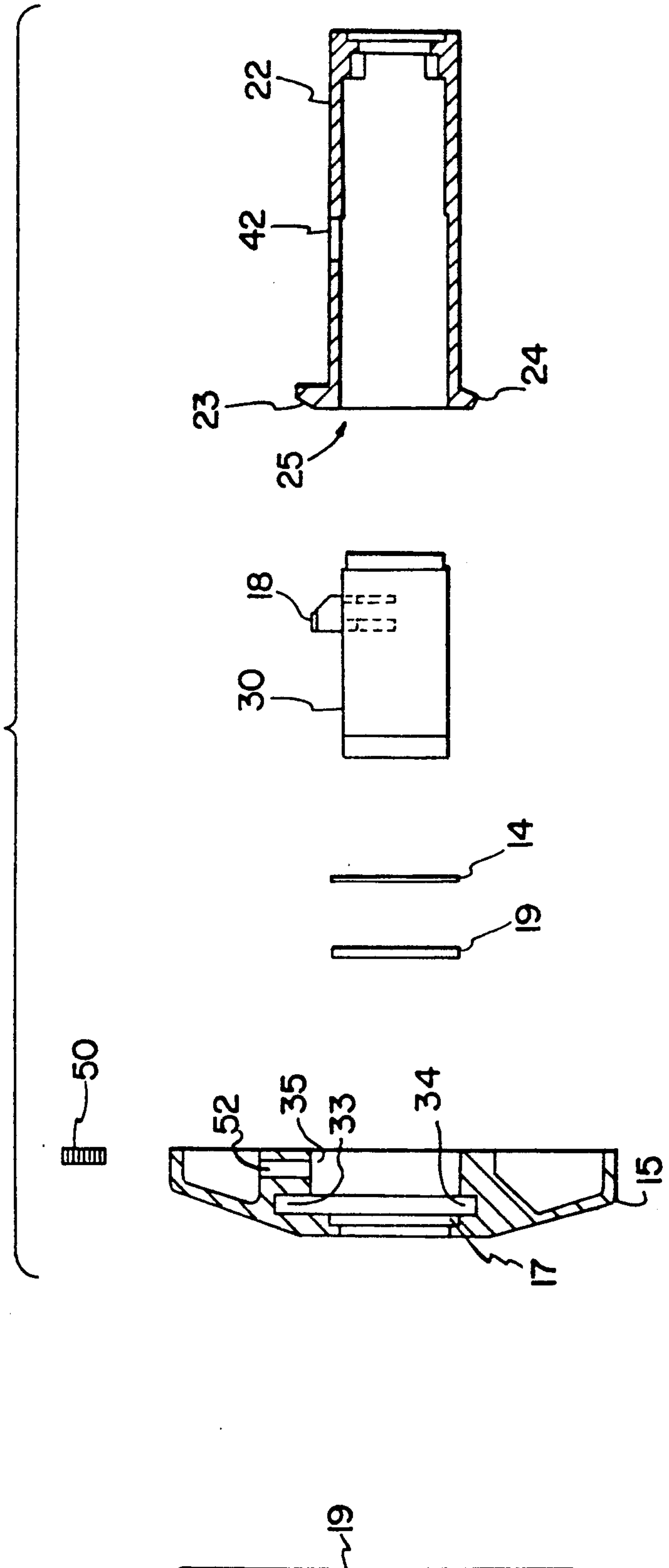
FIG. 3 is an exploded partly cross sectional side view of a cylinder front handle and cylinder/extension rod housing subassembly according to the preferred embodiment of the present invention.

FIG. 1 shows a conventional T-handle lock assembly to which the present invention is applicable. A lock cylinder 30 having a bolt 18 is mounted within one end of a cylinder/extension rod housing 22. An extension rod 20 having a threaded end portion is mounted within housing 22 at the other end thereof and is maintained within the housing 22 by means of a head 48 and teeth 58 which mate with corresponding cam means in the end of the housing 22. The lock assembly of FIG. 1 is shown in its unlocked position, in which bolt 18 is retracted from an opening 44 in a hollow shank portion 46 of T-handle housing unit 16. Bolt 18 is engageable with opening 44 through an aperture 42 in cylinder/extension rod housing 22. The housing end is forced into engagement with the teeth 58 by a spring 60 when bolt 18 is retracted from the opening 44. Cylinder front handle 15 thus pops out from its nested position within housing 16 and allows the extension rod 20 to be unscrewed from its complementary threaded section within the main body of the enclosure in which the assembly is installed. Cylinder front handle 15 contains a passage through which key 32 accesses the lock cylinder 30. A protector plate 19 preferably made of hardened steel is seated within an annular cutout in front handle 15 and is freely rotatable to resist drilling of the cylinder 30. Handle 15 is normally nested in handle housing 16. Other operational features of the T-handle lock assembly are described in U.S. Pat. No. 4,552,001, incorporated herein by reference.

Figure 2:
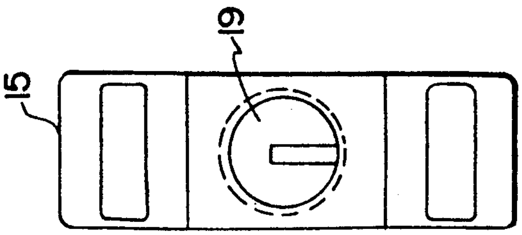
FIG. 2 is front view of a cylinder front handle according to one preferred embodiment of the present invention.

FIG. 2 is a front view of the novel cylinder front handle 15 according to one preferred embodiment of the present invention, and illustrates the positioning of the protector plate 19 within the handle.

Figure 5:
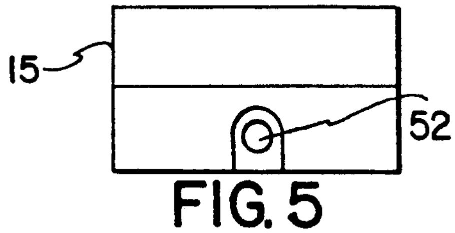
FIG. 5 is a top view of the cylinder front handle of FIGS. 2 and 4.
Figure 4:
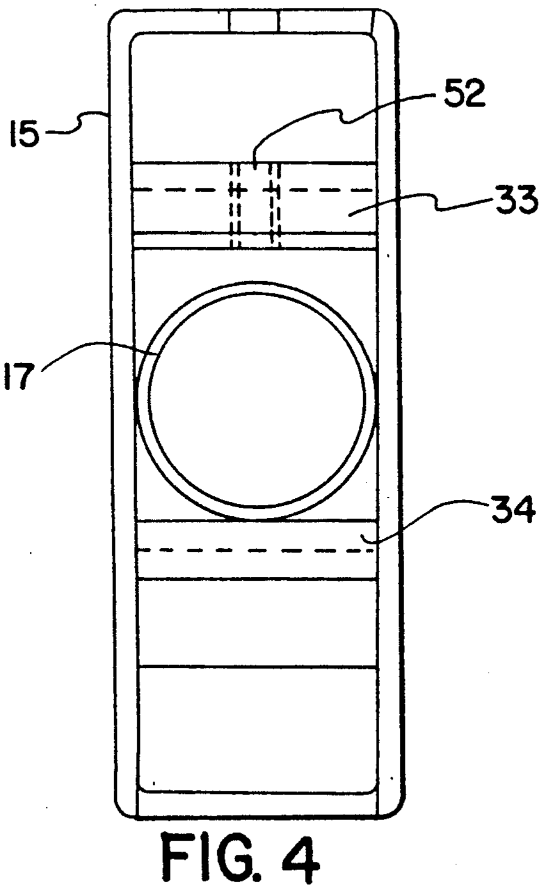
FIG. 4 is a rear view of the cylinder front handle of FIG. 2.

Referring to FIGS. 3, 4, and 5, a planar flange 25 is integrally formed on housing 22, and includes first and second edges 23 and 24. Cylinder front handle 15 includes a pair of recessed slots 33 and 34 into which the first and second edges 23 and 24 of the flange 25 are inserted. The top of an aperture 35 leading to slots 33 and 34 is tapered at a predetermined angle as are the outer portions of flange edges 23 and 24 to facilitate the angled insertion of flange edge 23 into slot 33. The flange edges 23 and 24 extend asymmetrically from the surface of the housing 22, in general corresponding to the asymmetrical lengths of slots 33 and 34 of front handle 15. However, slot 33 has a length slightly longer than the flange edge 23. To attach front handle 15 to the housing 22, flange edge 23 is inserted at an angle into the slot 33. The end of flange edge 23 is also tapered to facilitate the subsequent insertion of edge 24 into slot 34. When both edges 23 and 24 of flange 25 are fully inserted into the slots 33 and 34 of front handle 15, cylinder 30 is aligned with the key access passage of front handle 15 by abutting edge 24 against the end of slot 34. Front handle 15 further contains a single threaded aperture 52 adjacent slot 33 which extends in the same direction as slot 33. A single set screw 50 is screwed through threaded aperture 52 to engage a horizontal surface area of housing 22 and to rigidly secure the housing 22 to the front handle 15. Protector plate 19 fits within annular recess 17 within the handle 15, with a washer 14 positioned between the plate 19 and the face of the cylinder 30.

Figure 6:
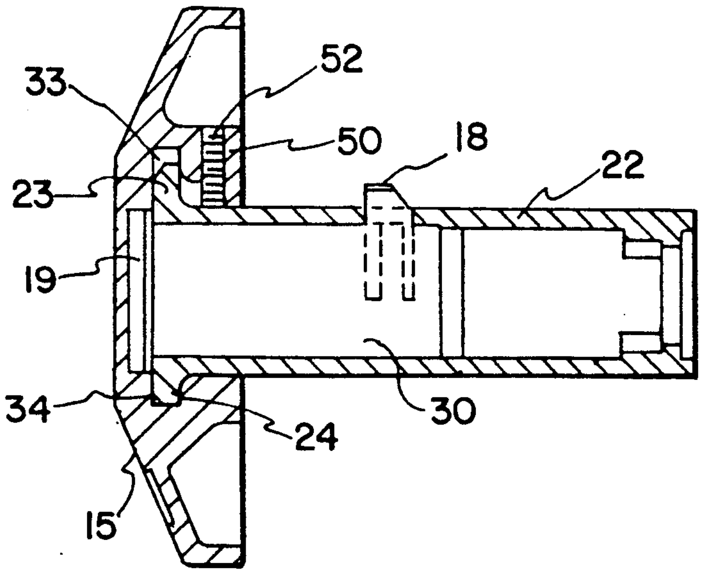
FIG. 6 is a partly cross sectional side view of the assembled components of FIG. 3.

FIG. 6 illustrates a fully assembled front handle and cylinder/extension rod housing combination, showing the set screw 50 in its fully secured position.

The improved T-handle lock assembly of the present invention achieves a significant simplification in manufacturing since the threaded aperture 52 constitutes the only machining required on the handle 15 or housing 22. Further, as the front handle and extension housing are made of stainless steel, the molds and cores utilized in the casting process are simplified. The stainless steel construction ensures high strength and resistance to attack. Servicing and replacement of the lock cylinder is also facilitated as only a single set screw is removed to disengage the front handle from the cylinder/extension housing and gain access to the lock cylinder. By virtue of the angled mating of the flange edges of the cylinder/extension housing with the front handle slots, it is impossible to remove the front handle even if the set screw is removed during an attack on the assembly as long as the T-handle is in the locked position. Thus, even if a side of the outer housing 16 were attacked and broken away, and the set screw 50 removed, the entire handle 15 could not be removed and hence the lock cylinder 30 would remain protected.

The invention being thus described, it will be apparent to those skilled in the art that the same may be varied in many ways. Such variations are not to be considered as a departure from the spirit and scope of the invention. Any and all such modifications are intended to be included within the scope of the following claims.

What is claimed is:

1. A T-handle lock assembly, comprising:

a lock cylinder having a bolt;

an extension rod;

a cylinder/extension rod housing of elongated hollow shape for accommodating said lock cylinder and said extension rod and terminating in an integral and substantially planar flange at one end thereof, first and second edges of said flange extending perpendicularly from the surface of said housing in an asymmetrical manner with respect to the surface of said housing; and a cylinder front handle containing a passage for key access to said lock cylinder and having asymmetrical slot means for interlocking with said first and second edges of said flange to prevent direction separation of said housing from said front handle.

2. A T-handle lock assembly according to claim 1, wherein said cylinder front handle further comprises a threaded aperture adjacent to and extending in the same direction as said slot means for accommodating a set screw therein, and said set screw being positionable to engage the surface of said housing to rigidly and securely align said lock cylinder with said passage.

3. A T-handle lock assembly according to claim 1, wherein said flange tapers at the ends of said first and second edges to facilitate insertion into said slot means.

4. A T-handle assembly according to claim 2, wherein said cylinder front handle further comprises means for positioning a cylinder protector plate in alignment with said passage to resist physical attack of the lock cylinder.

5. A T-handle lock assembly according to claim 1, further comprising a T-handle housing having a head portion within which said cylinder front handle nests when in a locked position, and a shank portion for accommodating said cylinder/extension rod housing and having an opening to receive said lock cylinder bolt.

6. A T-handle lock assembly, comprising:

a lock cylinder having a bolt;

an extension rod;

a cylinder/extension rod housing of elongated hollow shape for accommodating said lock cylinder and said extension rod and terminating in an integral and substantially planar flange at one end thereof, a first edge of said flange extending perpendicularly from the surface of said housing in a first direction, a second edge of said flange extending perpendicularly from the surface of said housing in a second direction opposite from said first direction, said second edge having a length shorter than said first edge; and a cylinder front handle containing a passage for key access to said lock cylinder and having first and second slots for respectively interlocking with said first and second edges of said flange.

7. A T-handle lock assembly according to claim 6, wherein said cylinder front handle further comprises a threaded aperture adjacent to and extending in the same direction as said first slot for accommodating a set screw therein, said set screw being capable of engaging the surface of said housing to rigidly and securely align said lock cylinder with said passage to enable key access thereto.

8. A T-handle lock assembly according to claim 7, wherein said flange tapers at the ends of said first and second edges to facilitate insertion into said first and second slots.

9. A T-handle lock assembly according to claim 6, wherein said cylinder front handle further comprises means for positioning a cylinder protector plate in alignment with said passage to resist physical attack of the lock cylinder.

10. A T-handle lock assembly according to claim 6, further comprising a T-handle housing having a head portion within which said cylinder front handle nests when in a locked position, and a shank portion for accommodating said cylinder/extension rod housing and having an opening to receive said lock cylinder bolt.

11. In a T-handle lock assembly of the type having a lock cylinder, an extension rod, a cylinder/extension rod housing, and a cylinder front handle, the improvement comprising:

asymmetrical connection means on said cylinder/extension rod housing for interlocking with corresponding asymmetrical slot means in said cylinder front handle; and at least one set screw for engaging a surface of said housing through said cylinder front handle to rigidly and securely align said lock cylinder with a key access passage of said cylinder front handle.

* * * * *

UNITED STATES PATENT AND TRADEMARK OFFICE

CERTIFICATE OF CORRECTION

PATENT NO. : 5,038,588

DATED : August 13, 1991

INVENTOR(S) : Charles E. HALL

It is certified that error appears in the above-identified patent and that said Letters Patent is hereby corrected as shown below:

In Col. 4, line 25, delete "direction" and insert therefor --direct--.

Signed and Sealed this

Twenty-second Day of June, 1993

Attest:

Michael K. Kirk

MICHAEL K. KIRK

*Attesting Officer* *Acting Commissioner of Patents and Trademarks*